(12) United States Patent
Cha et al.

(10) Patent No.: US 12,517,035 B2
(45) Date of Patent: Jan. 6, 2026

(54) CORROSION RATE MEASUREMENT EQUIPMENT ACCORDING TO ATMOSPHERIC ENVIRONMENT AND SHIP WITH THE SAME

(71) Applicants: HYUNDAI ENGINEERING & CONSTRUCTION CO., LTD., Seoul (KR); CorRel Technology Co., Ltd., Ulsan (KR)

(72) Inventors: Suho Cha, Seoul (KR); Kyeong Wan Park, Gunpo-si (KR); Sung Won Jung, Gunpo-si (KR); Insun Park, Seoul (KR)

(73) Assignees: HYUNDAI ENGINEERING & CONSTRUCTION CO., LTD., Seoul (KR); CorRel Technology Co., Ltd., Ulsan (KR)

( * ) Notice: Subject to any disclaimer, the term of this patent is extended or adjusted under 35 U.S.C. 154(b) by 414 days.

(21) Appl. No.: 18/222,504

(22) Filed: Jul. 17, 2023

(65) Prior Publication Data

US 2024/0068931 A1 Feb. 29, 2024

(30) Foreign Application Priority Data

Aug. 29, 2022 (KR) .......................... 10-2022-0108680

(51) Int. Cl.
*G01N 17/02* (2006.01)
*G01D 21/02* (2006.01)

(52) U.S. Cl.
CPC ............. *G01N 17/02* (2013.01); *G01D 21/02* (2013.01)

(58) Field of Classification Search
CPC ...... G01N 27/046; G01N 17/02; G01N 17/04; G01D 21/02
See application file for complete search history.

(56) References Cited

U.S. PATENT DOCUMENTS

| | | | | |
|---|---|---|---|---|
| 5,332,961 A | * | 7/1994 | Hammerle | G01N 33/2888 338/195 |
| 10,955,372 B2 | * | 3/2021 | Xu | G01N 27/045 |

FOREIGN PATENT DOCUMENTS

| | | | | |
|---|---|---|---|---|
| EP | 0932037 A2 | * | 7/1999 | ......... G01N 33/2888 |
| JP | 2020063989 A | * | 4/2020 | |
| KR | 10-0283136 B1 | | 4/2001 | |
| KR | 10-2018-0124436 A | | 11/2018 | |
| KR | 10-2020-0126572 A | | 11/2020 | |

\* cited by examiner

*Primary Examiner* — Jennifer Bahls
(74) *Attorney, Agent, or Firm* — Revolution IP, PLLC (57) ABSTRACT

In corrosion rate measurement equipment according to an atmospheric environment according to the present invention, the length of a conductive pattern for temperature correction of a corrosion sensor is greater than the length of a conductive pattern for corrosion measurement, and the surface area of the conductive pattern for temperature correction of a corrosion sensor is less than the surface area of the conductive pattern for corrosion measurement so that a measured error of reference resistance measured values measured in the conductive pattern for temperature correction is minimized and thus the measured values measured in the conductive pattern for corrosion measurement can be more accurately corrected by using the reference resistance measured value and thus, corrosion rate can be more accurately measured.

20 Claims, 3 Drawing Sheets

CORROSION RATE MEASUREMENT EQUIPMENT ACCORDING TO ATMOSPHERIC ENVIRONMENT AND SHIP WITH THE SAME

CROSS-REFERENCE TO RELATED APPLICATION

This application claims the benefit of Korean Patent Application No. 10-2022-0108680, filed on Aug. 29, 2022, in the Korean Intellectual Property Office, the disclosure of which is incorporated herein in its entirety by reference.

TECHNICAL FIELD

The present invention relates to corrosion rate measurement equipment according to an atmospheric environment and a ship with the same, and more particularly, to corrosion rate measurement equipment according to an atmospheric environment in which a measured error according to ambient temperature change is minimized so that reliability can be improved and monitoring can be remotely performed, and a ship with the same.

BACKGROUND ART

In general, since facilities are exposed to the risk of corrosion due to an ambient environment, the development of corrosion rate models for preventing damage due to corrosion has been briskly studied.

In the related art, a corrosion damage prediction model has been derived through a stochastic statistical method based on inspection data. However, when a corrosion state is directly measured, inspection costs are high and pieces of reference data are not sufficient.

In order to solve this problem, recently, a method of manually measuring corrosion rate by using an electrical resistance sensor made of metal has been used. However, a resistance value continues to change due to thermal expansion or thermal contraction of metal due to temperature change in the atmosphere. Thus, errors occur according to the temperature change of the atmosphere, not corrosion.

DISCLOSURE OF THE INVENTION

The present invention provides corrosion rate measurement equipment according to an atmospheric environment in which a measured error according to ambient temperature change is minimized so that reliability can be further improved, and a ship with the same.

According to an aspect of the present invention, there is provided corrosion rate measurement equipment according to an atmospheric environment, the corrosion rate measurement equipment including: a corrosion sensor comprising a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature; a power supply unit configured to supply power to the corrosion sensor; and a data processing unit configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate, wherein the conductive pattern for temperature correction may have a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

The conductive pattern for temperature correction and the conductive pattern for corrosion measurement may have same thicknesses.

The conductive pattern for temperature correction and the conductive pattern for corrosion measurement may be formed in a long band shape that is bent more than at least once, and a width of each of the conductive pattern for temperature correction and the conductive pattern for corrosion measurement may be formed uniformly in a longitudinal direction.

A width of the conductive pattern for temperature correction may be less than
a width of the conductive pattern for corrosion measurement.

The data processing unit may be configured to calculate the temperature correction value at each measurement point and to correct a corrosion resistance initial value measured in the conductive pattern for corrosion measurement at the initial measurement point by using the temperature correction value, and the resistance change rate may be calculated from the corrosion resistance initial value corrected as a temperature correction value calculated at a corresponding measurement point and a corrosion resistance measurement value measured at the corresponding measurement point.

The corrosion rate measurement equipment may further include a satellite communication unit configured to transmit the corrosion rate calculated by the data processing unit to a monitoring terminal that is preset through satellite communications.

The corrosion rate measurement equipment may further include a wireless communication unit configured to transmit the corrosion rate calculated by the data processing unit to a monitoring terminal that is preset through wireless communications.

The corrosion rate measurement equipment may further include a solar panel configured to collect solar energy, wherein the power supply unit may be configured to convert the solar energy collected by the solar panel into electrical energy, to perform charging and to supply power to the corrosion sensor.

The power supply unit may be configured to supply power to the corrosion sensor for a preset time.

The corrosion rate measurement equipment may further include: a case in which the data processing unit and the power supply unit are provided, and outside which the corrosion sensor is mounted; a temperature sensor installed outside the case and configured to measure temperature; and a humidity sensor installed outside the case and configured to measure humidity.

According to another aspect of the present invention, there is provided corrosion rate measurement equipment according to an atmospheric environment, the corrosion rate measurement equipment including: a case configured to be waterproof; a corrosion sensor mounted outside the case and including a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature; a solar panel mounted outside the case and configured to collect solar energy; a power supply unit provided inside the case and configured to convert solar energy collected by the solar panel into electrical energy, to perform charging and to supply power to the corrosion sensor; a data processing unit provided inside the case and configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate; and a satellite communication unit provided outside the case and configured to transmit corrosion rate calculated by the data processing unit to a monitoring terminal that is preset through satellite communications, wherein the conductive pattern for temperature correction may have a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

According to another aspect of the present invention, there is provided a ship with corrosion rate measurement equipment according to an atmospheric environment, wherein the corrosion rate measurement equipment may include: a corrosion sensor including a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature; a power supply unit configured to supply power to the corrosion sensor; and a data processing unit configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate, and the conductive pattern for temperature correction has a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

The conductive pattern for temperature correction and the conductive pattern for corrosion measurement may have same thicknesses.

The conductive pattern for temperature correction and the conductive pattern for corrosion measurement may be formed in a long band shape that is bent more than at least once, and a width of each of the conductive pattern for temperature correction and the conductive pattern for corrosion measurement may be formed uniformly in a longitudinal direction.

A width of the conductive pattern for temperature correction may be less than a width of the conductive pattern for corrosion measurement.

The data processing unit may be configured to calculate the temperature correction value at each measurement point and to correct a corrosion resistance initial value measured in the conductive pattern for corrosion measurement at the initial measurement point by using the temperature correction value, and the resistance change rate may be calculated from the corrosion resistance initial value corrected as a temperature correction value calculated at a corresponding measurement point and a corrosion resistance measurement value measured at the corresponding measurement point.

The ship may further include a satellite communication unit configured to transmit the corrosion rate calculated by the data processing unit to a monitoring terminal that is preset through satellite communications.

The ship may further include a wireless communication unit configured to transmit the corrosion rate calculated by the data processing unit to a monitoring terminal that is preset through wireless communications.

The ship may further include a solar panel configured to collect solar energy, wherein the power supply unit may be configured to convert the solar energy collected by the solar panel into electrical energy, to perform charging and to supply power to the corrosion sensor.

The ship may further include: a case in which the data processing unit and the power supply unit are provided, and outside which the corrosion sensor is mounted; a temperature sensor installed outside the case and configured to measure temperature; and a humidity sensor installed outside the case and configured to measure humidity.

Effects of the Invention

In corrosion rate measurement equipment according to an atmospheric environment according to the present invention, the length of a conductive pattern for temperature correction of a corrosion sensor is greater than the length of a conductive pattern for corrosion measurement, and the surface area of the conductive pattern for temperature correction of a corrosion sensor is less than the surface area of the conductive pattern for corrosion measurement so that a measured error of reference resistance measured values measured in the conductive pattern for temperature correction is minimized and thus the measured values measured in the conductive pattern for corrosion measurement can be more accurately corrected by using the reference resistance measured value and thus, corrosion rate can be more accurately measured.

In addition, even when the corrosion rate measurement equipment is installed in a ship operating overseas or at sea, transmission and reception of data can be performed by using satellite communication so that remote monitoring can be performed without restrictions in the use environment or installation location.

In addition, the corrosion rate measurement equipment is configured to use a solar panel so that there is an advantage of continuously measuring the corrosion rate and transmitting data without supplying an external commercial power source.

DETAILED DESCRIPTION FOR CARRYING OUT THE INVENTION

Hereinafter, the present invention will be described in detail with reference to the accompanying drawings, in which exemplary embodiments of the invention are shown.

Figure 1:
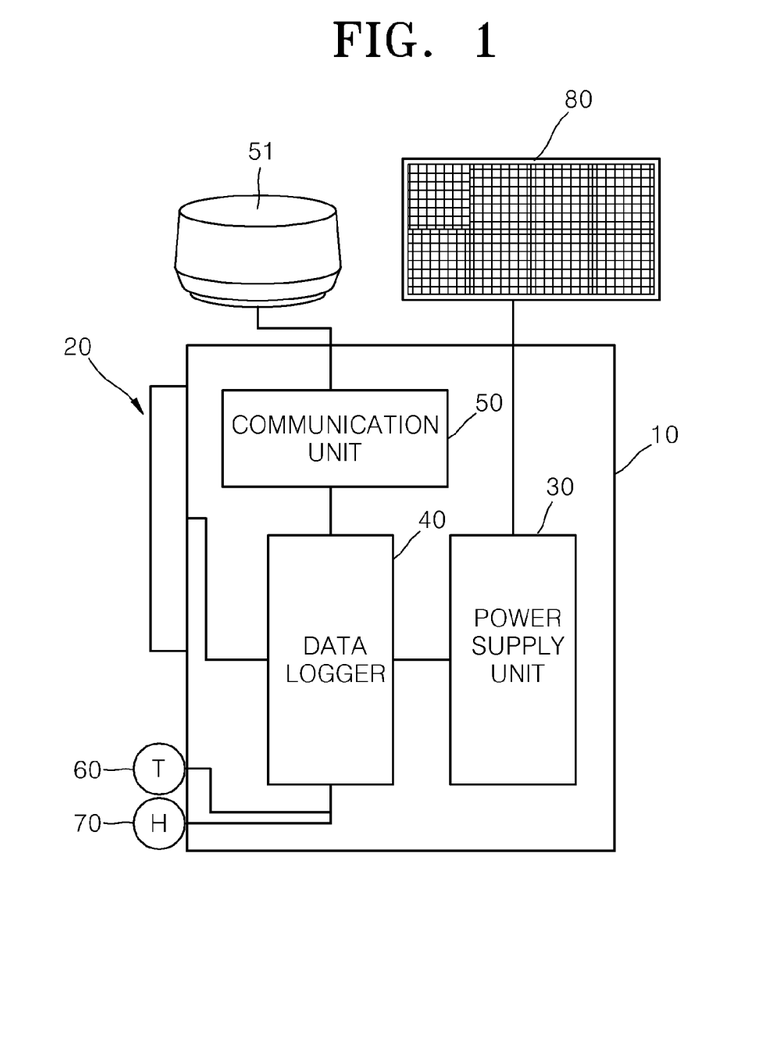
FIG. 1 is a diagram schematically illustrating the configuration of corrosion rate measurement equipment according to an atmospheric environment, according to an embodiment of the present invention.
Figure 2:
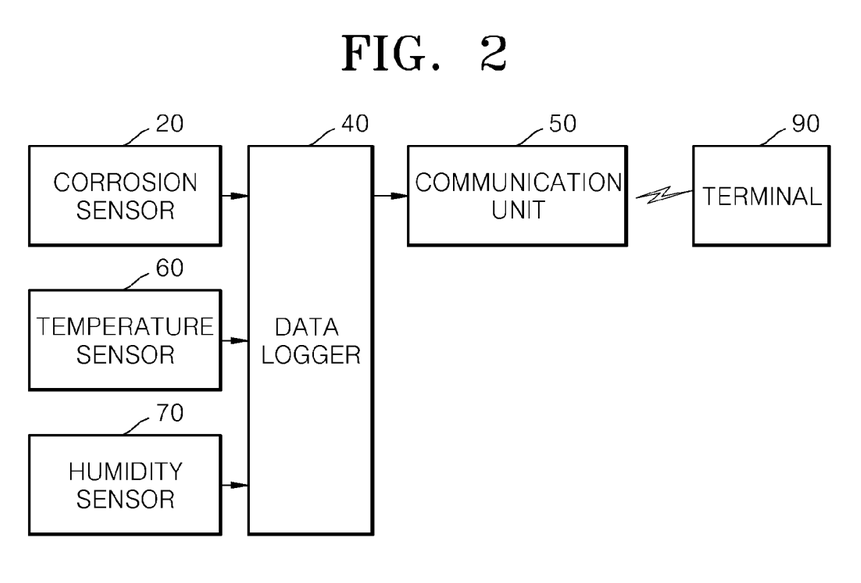
FIG. 2 is a control block diagram of corrosion rate measurement equipment according to an atmospheric environment, according to an embodiment of the present invention.

FIG. 1 is a diagram schematically illustrating the configuration of corrosion rate measurement equipment according to an atmospheric environment, according to an embodiment of the present invention, and FIG. 2 is a control block diagram of corrosion rate measurement equipment according to an atmospheric environment, according to an embodiment of the present invention.

Referring to FIGS. 1 and 2, corrosion rate measurement equipment according to an atmospheric environment, according to an embodiment of the present invention may be used to measure corrosion rate according to the atmospheric environment during domestic and foreign construction works, or to monitor corrosion rate according to the atmospheric environment during sea transportation of various equipment. Also, the corrosion rate measurement equipment may be installed on equipment or structures on land, or may also be installed underwater or on a ship.

The corrosion rate measurement equipment includes a case 10, a corrosion sensor 20, a power supply unit 30, a data processing unit 40, a communication unit 50, a temperature sensor 60, a humidity sensor 70, a solar panel 80, and a monitoring terminal 90.

The case 10 constitutes the exterior and is formed to have a waterproof function to be installed on a ship or underwater or to be mounted on marine transportation facilities.

The power supply unit 30, the data processing unit 40, and the communication unit 50 and the like are provided inside the case 10. The corrosion sensor 20, the temperature sensor 60, and the humidity sensor 70 are mounted outside the case 10.

Figure 3:
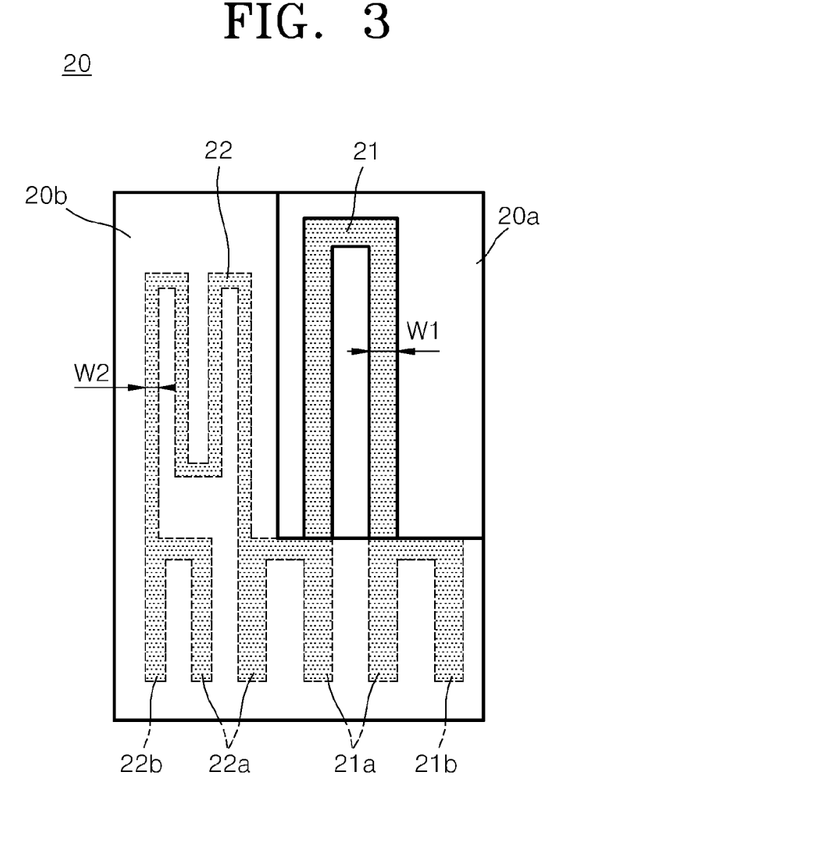
FIG. 3 is a plan view illustrating a conductive pattern for temperature correction and a conductive pattern for corrosion measurement of a corrosion sensor according to an embodiment of the present invention.

FIG. 3 is a plan view illustrating a conductive pattern for temperature correction and a conductive pattern for corrosion measurement of a corrosion sensor according to an embodiment of the present invention.

Referring to FIG. 3, the corrosion sensor 20 includes a substrate 20a, a conductive pattern 21 for corrosion measurement, and a conductive pattern 22 for temperature correction. Here, the case where the corrosion sensor 20 is a corrosion probe, will be described.

The substrate 20a is formed in the form of a flat insulator. A thin film made of metal is deposited on the substrate 20a to a predetermined thickness by using a vacuum deposition method or the like so that the conductive pattern 21 for corrosion measurement and the conductive pattern 22 for temperature correction can be formed. However, embodiments of the present invention are not limited thereto, and other substrates, such as using a thin plate, are also applicable.

The conductive pattern 21 for corrosion measurement is a conductive pattern, that is an electrode, which is formed on the substrate 20a, is exposed to an ambient environment and is formed so that the thickness of the conductive pattern 21 for corrosion measurement changes according to not only the ambient temperature but also corrosion by the atmospheric environment.

The conductive pattern 21 for corrosion measurement is formed in a long band shape that is bent more than once and has a first width W1, a first length L1, and a first surface area A1, which are preset. The cross-section of the conductive pattern 21 for corrosion measurement is formed in a rectangle shape, for example. However, embodiments of the present invention are not limited thereto, and the cross-section of the conductive pattern 21 for corrosion measurement may be modified in various shapes. The first width W1 and the thickness of the conductive pattern 21 for corrosion measurement are formed uniformly in a longitudinal direction. Also, the first width W1 of the conductive pattern 21 for corrosion measurement is greater than a second width W2 of the conductive patter 22 for temperature correction to be described below.

Two first resistance measurement terminals 21a and one first power supply terminal 21b are provided at an end of the conductive pattern 21 for corrosion measurement.

The conductive pattern 22 for temperature correction is a reference sensor for measuring a reference value for correcting the effect of ambient temperature with respect to a resistance value measured in the conductive pattern 21 for corrosion measurement. Thus, the surface of the conductive pattern 22 for temperature correction is covered by a protective layer 20b not to be exposed to the ambient environment, that is, corrosion. The protective layer 20b is a layer formed by applying an insulating paint or the like onto the surface of the conductive pattern 22 for temperature correction.

The conductive pattern 22 for temperature correction is a conductive pattern, that is, an electrode which is formed on the substrate 20a to be connected to the conductive pattern 21 for corrosion measurement so that the thickness of the conductive pattern 22 for temperature correction changes according to the ambient temperature.

Two second resistance measurement terminals 22a and one second power supply terminal 22b are provided at an end of the conductive pattern 22 for temperature correction.

The conductive pattern 22 for temperature correction is formed in a long band shape that is bent more than once, and has a greater length than the length of the conductive pattern 21 for corrosion measurement and has a less surface area than the surface area of the conductive pattern 21 for corrosion measurement. That is, the conductive pattern 22 for temperature correction is formed to have the second width W2 that is set to be less than the first width W, to have a second length L2 that is set to be greater than the first length L1 and to have a second surface area A2 that is set to be greater than the first surface area A1. The thickness and the second width W2 of the conductive pattern 22 for temperature correction are formed uniformly in the longitudinal direction. The cross-section of the conductive pattern for temperature correction is formed in a rectangle shape, for example. However, embodiments of the present invention are not limited thereto, and the cross-section of the conductive pattern 22 for temperature correction may be modified in various shapes.

The relationship between a resistance value R measured by the corrosion sensor 20, the length of a conductive pattern, and the surface area of the conductive pattern is given by the equation 1.

$$R = \mu \frac{L}{A},\qquad [\text{Equation 1}]$$

where μ is a coefficient, L is the length of the conductive pattern, and A is the surface area of the conductive pattern.

In the present invention, the conductive pattern 22 for temperature correction has a greater length L than the length of the conductive pattern 21 for corrosion measurement and a less surface area A than the surface area of the conductive pattern 21 for corrosion measurement, so that a reference resistance measured value R2 measured in the conductive pattern 22 for temperature correction is set to be relatively greater than a corrosion resistance measured value R1 measured in the conductive pattern 21 for corrosion measurement. As the reference resistance measured value R2 measured in the conductive pattern 22 for temperature correction increases, a relative measured error of the reference resistance measured value R2 decreases, so that temperature correction of the corrosion resistance measured value R1 of the conductive pattern 21 for corrosion measurement can be more accurately performed. Here, the relative measured error is also referred to as a relative error and means a value obtained by dividing a difference between a true value and a measured value by the true value.

The following Table 1 shows comparison of the relative measured error according to the size of the reference resistance measured value R2 of the conductive pattern 22 for temperature correction.

Referring to Table 1, when a reference resistance initial value $R2_i$ of the conductive pattern 22 for temperature correction increases three times from 0.015 to 0.045, the relative measured error decreases about 66% from 0.033 to 0.011. Here, a case where measurement resolution is 0.001Ω, will be described, and thus, the reference resistance measured value R2 is a value rounded to 4 decimal places from a true value $R2_T$.

TABLE 1

| | Reference resistance initial value ($R2_i$) | True value ($R2_T$) | Reference resistance measured value (R2) | Relative measured error |
|---|---|---|---|---|
| CASE 1 | 0.015 | 0.0155 | 0.015 | (0.0155 − 0.015)/0.015 = 0.033 |
| CASE 2 | 0.045 | 0.0455 | 0.045 | (0.0455 − 0.045)/0.045 = 0.011 |

As described above, as the reference resistance initial value $R2_i$ of the conductive pattern 22 for temperature correction increases, the relative measured error decreases.

Thus, the conductive pattern 22 for temperature correction is set to have a greater length L than the length of the conductive pattern 21 for corrosion measurement and to have a less surface area A than the surface area of the conductive pattern 21 for corrosion measurement so that the relative measurement of the reference resistance measured value R2 measured in the conductive pattern for temperature correction can be minimized. When the relative measured error of the reference resistance measured value R2 is minimized, the accuracy of a corrosion resistance initial value $R1_i$ to be described below and to be corrected by using the reference resistance measured value R2 can be improved.

The power supply unit 30 is a power supply unit for supplying power to the corrosion sensor 20. The power supply unit 30 is connected to the solar panel 80 for collecting solar energy, includes a battery for converting solar energy collected by the solar panel 80 into electrical energy and charging, and supplies power to the corrosion sensor 20 from the battery. The power supply unit 30 may supply power to the corrosion sensor 20 at preset time intervals and may also supply power continuously to the corrosion sensor 20 for a preset time.

The data processing unit 40 may include a data logger (not shown) that supplies power from the power supply unit 30 and collects a resistance value of the corrosion sensor 20, and a data calculation unit (not shown) that calculates a temperature correction value, a corrosion resistance correction value and corrosion rate to be described below according to the measured resistance value. Both the data logger (not shown) and the data calculation unit (not shown) may be provided inside the case 10, and only the data logger (not shown) may be provided inside the case 10, and the data calculation unit (not shown) may be provided in a preset server (not shown) communicatively connected to the data logger (not shown).

The data processing unit 40 calculates a temperature correction value according to the reference resistance measured value R2 measured in the conductive pattern 22 for temperature correction and corrects the corrosion resistance initial value $R1_i$ measured in the conductive pattern 21 for corrosion measurement by using the temperature correction value to calculate a resistance change rate according to corrosion from the corrosion resistance initial value $R1_i$. Also, the data processing unit 40 calculates corrosion rate by using the corrosion resistance initial value $R1_i$. An algorithm for calculating the temperature correction value and calculating corrosion rate from the corrected corrosion resistance initial value $R1_i$ is previously built in the data processing unit 40.

The communication unit 50 includes at least one of a satellite communication unit that transmits corrosion rate calculated by the data processing unit 40 to the monitoring terminal 90 that is preset through satellite communications using a satellite antenna 51, and a wireless communication unit that transmits the corrosion rate to the monitoring terminal 90 through wireless communications.

The temperature sensor 60 is installed outside the case 10 and measures the temperature of the ambient environment. The temperature measured by the temperature sensor 60 is referred when data is generated by calculating the corrosion rate by using the data processing unit 40.

The humidity sensor 70 is installed outside the case 10 and measures the humidity of the ambient environment. The humidity measured by the humidity sensor 70 is referred when data is generated by calculating the corrosion rate by using the data processing unit 40.

An operating method of corrosion rate measurement equipment according to an atmospheric environment having the above-described configuration according to the present invention will be described below.

The power supply unit 30 converts solar energy collected by the solar panel into electrical energy and charges in the battery. Thus, the power supply unit 30 does not need to receive the supply of electricity from the outside, and self-power generation of the power supply unit 30 is possible by using the solar panel 80. Thus, the power supply unit 30 is continuously operable even overseas, during sea transportation, or in remote areas.

The power supply unit 30 supplies power to the corrosion sensor 20 and the data processing unit 40 at preset time intervals.

When power is supplied to the corrosion sensor 20, the corrosion resistance initial value $R1_i$ of the conductive pattern 21 for corrosion measurement and the reference resistance initial value $R2_i$ of the conductive pattern 22 for temperature correction are respectively measured and stored in the data processing unit 40.

In addition, for each of a plurality of measurement points set at set time intervals from an initial measurement point, the corrosion resistance measured value R1 of the conductive pattern 21 for corrosion measurement is measured, and the reference resistance measured value R2 of the conductive pattern 22 for temperature correction is measured.

The data processing unit 40 calculates a temperature correction value C by using the reference resistance initial value $R2_i$ measured in the conductive pattern 22 for temperature correction at the initial measurement point and the reference resistance measured value R2 measured at a corresponding measurement point at which a set time has elapsed from the initial measurement point.

Equation 2 is an equation in which the temperature correction value C is calculated at the corresponding measurement point.

$$C = \frac{R2}{R2_i},\qquad\text{[Equation 2]}$$

where R2 is a reference resistance measured value measured in the conductive pattern 22 for temperature correction, and $R2_i$ is a reference resistance initial value of the conductive pattern 22 for temperature correction.

Because the reference resistance measured value R2 measured at each measurement point is reflected on the temperature correction value C, the temperature correction value C is calculated as a different value for each measurement point.

When the temperature correction value C is calculated, the data processing unit 40 corrects the corrosion resistance initial value R1 by using the calculated temperature correction value C.

Because the corrosion resistance initial value $R1_i$ is a measured value affected by both temperature and corrosion, the corrosion resistance initial value $R1_i$ is corrected by using the temperature correction value C. That is, when the temperature correction value C is reflected on the corrosion resistance initial value $R1_i$, the corrosion resistance correction value $R_C$ affected by only corrosion without being affected by temperature is calculated.

Equation 3 is an equation in which the corrosion resistance correction value $R_C$ is calculated.

$$R_C = C \times R1_i \qquad\text{[Equation 3]}$$

The corrosion resistance correction value $R_C$ is a value obtained by correcting the corrosion resistance initial value $R1_i$ measured in the conductive pattern 21 for corrosion measurement at the initial measurement point.

Here, because the reference resistance measured value R2 measured at a corresponding measurement point is reflected on the temperature correction value C, the effect of temperature at the measurement point is reflected on the corrosion resistance correction value $R_C$, and the corrosion resistance correction value $R_C$ is corrected as a different value for each measurement point.

For example, the temperature correction value C is calculated by using the reference resistance measured value R2 measured in the conductive pattern 22 for temperature correction at a second measurement point in which a set time has elapsed from the initial measurement point. The corrosion resistance correction value $R_C$ is calculated by correcting the corrosion resistance initial value $R1_i$ measured at the initial measurement point by using the calculated temperature correction value C, and a resistance change rate of the calculated corrosion resistance correction value $R_C$ and the corrosion resistance measured value R2 measured at the second measurement point can be calculated.

Thus, in the present invention, a plurality of corrosion resistance measured values R1 measured at each measurement point are not corrected, and the corrosion resistance initial value $R1_i$ is corrected by using the temperature correction value C calculated at the measurement point. Correcting the initial corrosion resistance value $R1_i$ at the initial measurement point does not change the corrosion resistance measured values at each measurement point, so that data accuracy can be improved. In addition, compared to changing the corrosion resistance measured values R1 at each measurement point, a resistance change rate with respect to corrosion can be more accurately calculated.

The data processing unit 40 may calculate a change rate of the corrosion resistance correction value $R_C$ and the corrosion resistance measured value R1 measured at the corresponding measurement point, and may calculate a thickness loss and a corrosion rate from the change rate.

The data processing unit 40 transmits data including the calculated corrosion rate, the temperature measured by the temperature sensor 60, and humidity measured by the humidity sensor 70 to the monitoring terminal 90 through the communication unit 50.

In the present embodiment, a case where the communication unit 50 transmits data through satellite communications, will be described. Thus, data can be remotely transmitted/received not only in Korea but also anywhere in the world.

When the communication unit 50 fails to transmit data, the communication unit 50 is configured to transmit data again after a preset time so that unnecessary power consumption can be minimized.

Meanwhile, in the present embodiment, the conductive pattern 22 for temperature correction has a greater length L than the length of the conductive pattern 21 for corrosion measurement and a less surface area A than the surface area of the conductive pattern 21 for corrosion measurement, so that the reference resistance measured value R2 measured in the conductive pattern 22 for temperature correction is set to be relatively greater than the corrosion resistance measured value R1 measured in the conductive pattern 21 for corrosion measurement. As the reference resistance measured value R2 measured in the conductive pattern 22 for temperature correction increases, a relative measured error decreases. Thus, temperature correction of the corrosion resistance measured value R1 of the conductive pattern 21 for corrosion measurement can be more accurately performed.

Table 2 below shows comparison of an error according to a true value and a measured value in two cases where corrosion resistance initial values $R1_i$ of the conductive pattern 21 for corrosion measurement are the same and reference resistance initial values of the conductive pattern 22 for temperature correction are different from each other.

TABLE 2

| $R1_i$ | $R2_i$ | R1 | R2 | $R2_T$ | $(R_C)_m$ $(=(R2/R2_i)*R1)$ | $(R_C)_T$ $(=(R2_T/R2_i)*R1)$ | A $((R_C)_m/R1_i)$ | B $((R_C)_T/R1_i)$ | Error $(A - B)$ |
|---|---|---|---|---|---|---|---|---|---|
| 0.015 | 0.017 | 0.017 | 0.016 | 0.0164 | 0.0159 | 0.0164 | 1.06 | 1.093 | −0.026 |
| 0.015 | 0.034 | 0.017 | 0.033 | 0.0334 | 0.0165 | 0.0167 | 1.1 | 1.113 | −0.013 |

Here, $(R_C)_m$ is a corrosion resistance value obtained by correcting the corrosion resistance measured value R1 by using the reference resistance measured value R2 that is a measured value of the conductive pattern 22 for temperature correction, $(R_C)_T$ is a corrosion resistance correction value obtained by correcting the corrosion resistance measured value R1 by using a true value of the conductive pattern 22 for temperature correction, A is a ratio of the corrosion resistance correction value $(R_C)_m$ obtained as a measured value with respect to the corrosion resistance initial value $R1_i$, and B is a ratio of the corrosion resistance correction value $(R_C)_T$ obtained as a true value with respect to the corrosion resistance initial value $R1i$, and an error represents a difference between the corrosion resistance correction value $(R_C)_m$ corrected as a measured value and the corrosion resistance correction value $(R_C)_T$ corrected as a true value.

Referring to Table 2, when the reference resistance initial value $R1_i$ of the conductive pattern 22 for temperature correction is large, the difference between the corrosion resistance correction value $(R_C)_m$ corrected as a measured value and the corrosion resistance correction value $(R_C)_T$ corrected as a true value decreases. That is, when the reference resistance initial value $R1_i$ of the conductive pattern 22 for temperature correction is large, an error between the true value and the measured value can be reduced.

Thus, in the present invention, the conductive pattern 22 for temperature correction has a greater length L than the length of the conductive pattern 21 for corrosion measurement and a less surface area A than the surface area of the conductive pattern 21 for corrosion measurement so that the reference resistance measured value R2 measured in the conductive pattern 22 for temperature correction is set to be relatively greater than the corrosion resistance measured value R1 measured in the conductive pattern 21 for corrosion measurement and thus a measured error of the conductive pattern 22 for temperature correction can be minimized. The measured error of the reference resistance measured value R2 measured in the conductive pattern 22 for temperature correction is minimized so that the corrosion resistance measured value R1 measured in the conductive pattern for corrosion measurement can be more accurately corrected by using the reference resistance measured value R2 and thus, corrosion rate can be more accurately measured.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. Corrosion rate measurement equipment according to an atmospheric environment, the corrosion rate measurement equipment comprising:
   a corrosion sensor comprising a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature;
   a power supply unit configured to supply power to the corrosion sensor; and
   a data processing unit configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate,
   wherein the conductive pattern for temperature correction has a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

2. The corrosion rate measurement equipment of claim 1, wherein the conductive pattern for temperature correction and the conductive pattern for corrosion measurement have same thicknesses.

3. The corrosion rate measurement equipment of claim 1, wherein the conductive pattern for temperature correction and the conductive pattern for corrosion measurement are formed in a long band shape that is bent more than at least once, and a width of each of the conductive pattern for temperature correction and the conductive pattern for corrosion measurement is formed uniformly in a longitudinal direction.

4. The corrosion rate measurement equipment of claim 1, wherein a width of the conductive pattern for temperature correction is less than a width of the conductive pattern for corrosion measurement.

5. The corrosion rate measurement equipment of claim 1, wherein the data processing unit is configured to calculate the temperature correction value at each measurement point and to correct a corrosion resistance initial value measured in the conductive pattern for corrosion measurement at the initial measurement point by using the temperature correction value, and the resistance change rate is calculated from the corrosion resistance initial value corrected as a temperature correction value calculated at a corresponding measurement point and a corrosion resistance measurement value measured at the corresponding measurement point.

6. The corrosion rate measurement equipment of claim 1, further comprising a satellite communication unit configured to transmit the corrosion rate calculated by the data processing unit to a monitoring terminal that is preset through satellite communications.

7. The corrosion rate measurement equipment of claim 1, further comprising a wireless communication unit configured to transmit the corrosion rate calculated by the data processing unit to a monitoring terminal that is preset through wireless communications.

8. The corrosion rate measurement equipment of claim 1, further comprising a solar panel configured to collect solar energy, wherein the power supply unit is configured to convert the solar energy collected by the solar panel into electrical energy, to perform charging and to supply power to the corrosion sensor.

9. The corrosion rate measurement equipment of claim 1, wherein the power supply unit is configured to supply power to the corrosion sensor for a preset time.

10. The corrosion rate measurement equipment of claim 1, further comprising:
a case in which the data processing unit and the power supply unit are provided,
and outside which the corrosion sensor is mounted;
a temperature sensor installed outside the case and configured to measure temperature; and
a humidity sensor installed outside the case and configured to measure humidity.

11. Corrosion rate measurement equipment according to an atmospheric environment, the corrosion rate measurement equipment comprising:

a case configured to be waterproof;
a corrosion sensor mounted outside the case and comprising a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature;
a solar panel mounted outside the case and configured to collect solar energy;
a power supply unit provided inside the case and configured to convert solar energy collected by the solar panel into electrical energy, to perform charging and to supply power to the corrosion sensor;
a data processing unit provided inside the case and configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate; and
a satellite communication unit provided outside the case and configured to transmit corrosion rate calculated by the data processing unit to a monitoring terminal that is preset through satellite communications,
wherein the conductive pattern for temperature correction has a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

12. A ship with corrosion rate measurement equipment according to an atmospheric environment, wherein the corrosion rate measurement equipment comprises:
a corrosion sensor comprising a substrate, a conductive pattern for corrosion measurement provided to be exposed to an ambient environment on the substrate and formed so that a thickness of the conductive pattern for corrosion measurement changes according to an ambient temperature and corrosion, and a conductive pattern for temperature correction of which surface is covered by a protective layer so that the conductive pattern for temperature correction is not exposed to the ambient environment on the substrate and of which thickness changes according to the ambient temperature;

a power supply unit configured to supply power to the corrosion sensor; and a data processing unit configured to collect a corrosion resistance measured value of the conductive pattern for corrosion measurement and a reference resistance measured value of the conductive pattern for temperature correction, respectively, from an initial measurement point at each measurement point at set time intervals when power is supplied to the corrosion sensor, to calculate a temperature correction value according to the reference resistance measured value of the conductive pattern for temperature correction, to correct a measured value in the conductive pattern for corrosion measurement as the temperature correction value and then to derive a resistance change rate measured in the conductive pattern for corrosion measurement and to calculate corrosion rate according to the resistance change rate, and the conductive pattern for temperature correction has a greater length than a length of the conductive pattern for corrosion measurement and a less surface area than a surface area of the conductive pattern for corrosion measurement so that the reference resistance measured value of the conductive pattern for temperature correction is set to be greater than the corrosion resistance measured value of the conductive pattern for corrosion measurement so as to reduce a relative measured error of the conductive pattern for temperature correction.

13. The ship of claim 12, wherein the conductive pattern for temperature correction and the conductive pattern for corrosion measurement have same thicknesses.

14. The ship of claim 12, wherein the conductive pattern for temperature correction and the conductive pattern for corrosion measurement are formed in a long band shape that is bent more than at least once, and a width of each of the conductive pattern for temperature correction and the conductive pattern for corrosion measurement is formed uniformly in a longitudinal direction.

15. The ship of claim 12, wherein a width of the conductive pattern for temperature correction is less than a width of the conductive pattern for corrosion measurement.

16. The ship of claim 12, wherein the data processing unit is configured to calculate the temperature correction value at each measurement point and to correct a corrosion resistance initial value measured in the conductive pattern for corrosion measurement at the initial measurement point by using the temperature correction value, and the resistance change rate is calculated from the corrosion resistance initial value corrected as a temperature correction value calculated at a corresponding measurement point and a corrosion resistance measurement value measured at the corresponding measurement point.

17. The ship of claim 12, further comprising a satellite communication unit configured to transmit the corrosion rate calculated by the data processing unit to a monitoring terminal that is preset through satellite communications.

18. The ship of claim 12, further comprising a wireless communication unit configured to transmit the corrosion rate calculated by the data processing unit to a monitoring terminal that is preset through wireless communications.

19. The ship of claim 12, further comprising a solar panel configured to collect solar energy, wherein the power supply unit is configured to convert the solar energy collected by the solar panel into electrical energy, to perform charging and to supply power to the corrosion sensor.

20. The ship of claim 12, further comprising:
a case in which the data processing unit and the power supply unit are provided, and outside which the corrosion sensor is mounted;
a temperature sensor installed outside the case and configured to measure temperature; and
a humidity sensor installed outside the case and configured to measure humidity.

* * * * *